(12) United States Patent
Teranishi et al.

(10) Patent No.: US 8,312,741 B2
(45) Date of Patent: Nov. 20, 2012

(54) CLEAVING METHOD FOR A GLASS FILM

(75) Inventors: Yasuo Teranishi, Otsu (JP); Yasuhiro Matsumoto, Otsu (JP); Taiki Minari, Otsu (JP); Takaya Furuta, Otsu (JP)

(73) Assignee: Nippon Electric Glass Co., Ltd., Shiga (JP)

( * ) Notice: Subject to any disclaimer, the term of this patent is extended or adjusted under 35 U.S.C. 154(b) by 0 days.

(21) Appl. No.: 13/185,673

(22) Filed: Jul. 19, 2011

(65) Prior Publication Data

US 2012/0017642 A1 Jan. 26, 2012

(30) Foreign Application Priority Data

Jul. 22, 2010 (JP) ................................. 2010-165093

(51) Int. Cl.
*C03B 9/46* (2006.01)
*C03B 21/02* (2006.01)
(52) U.S. Cl. .................................. 65/97; 65/98; 65/174
(58) Field of Classification Search .............. 65/90–101, 65/25.1–26, 174–177
See application file for complete search history.

(56) References Cited

U.S. PATENT DOCUMENTS

| | | | | |
|---|---|---|---|---|
| 2,457,785 A | * | 12/1948 | Slayter et al. | 65/181 |
| 3,453,097 A | * | 7/1969 | Hafner | 65/112 |
| 3,795,572 A | * | 3/1974 | De Torre | 428/192 |
| 4,743,284 A | * | 5/1988 | Mouly et al. | 65/113 |
| 4,749,400 A | * | 6/1988 | Mouly et al. | 65/97 |
| 4,828,900 A | * | 5/1989 | Mouly | 428/192 |
| 5,421,450 A | * | 6/1995 | Kitagawa et al. | 198/847 |
| 6,101,845 A | * | 8/2000 | Kojima et al. | 65/101 |
| 6,192,711 B1 | * | 2/2001 | Lisec | 65/182.2 |
| 6,220,056 B1 | * | 4/2001 | Ostendarp | 65/175 |
| 6,311,523 B1 | * | 11/2001 | Kojima et al. | 65/25.3 |
| 6,815,070 B1 | * | 11/2004 | Burkle et al. | 428/425.6 |
| 7,005,317 B2 | * | 2/2006 | Chin et al. | 438/106 |

(Continued)

FOREIGN PATENT DOCUMENTS

EP 2 332 856 6/2011

(Continued)

OTHER PUBLICATIONS

International Search Report issued Oct. 25, 2011 in corresponding International (PCT) Application No. PCT/JP2011/066241.

*Primary Examiner* — Jodi C Franklin
(74) *Attorney, Agent, or Firm* — Wenderoth, Lind & Ponack, L.L.P.

(57) ABSTRACT

In a cleaving apparatus for a glass film, an initial crack, which is formed at a leading end portion of a preset cleaving line of a glass film, is propagated along the preset cleaving line by a thermal stress generated in the glass film through localized heating performed along the preset cleaving line and cooling of a heated region resulting from the localized heating. At this time, a resin sheet having higher flexibility than the glass film is arranged in a cleaving region, and the resin sheet is floated by blowing a gas on a lower surface of the resin sheet by a floating unit. Then, a preset cleaving portion of the glass film including the preset cleaving line is lifted and supported while being covered with the floated resin sheet from below, and in this state, the glass film is cleaved.

4 Claims, 6 Drawing Sheets

U.S. PATENT DOCUMENTS

| | | | |
|---|---|---|---|
| 7,337,633 B2* | 3/2008 | Shiraishi et al. | 65/25.2 |
| 7,387,951 B2* | 6/2008 | Yamamoto et al. | 438/464 |
| 7,656,012 B2* | 2/2010 | Doan | 257/668 |
| 2003/0148057 A1* | 8/2003 | Dietz et al. | 428/43 |
| 2005/0101109 A1* | 5/2005 | Chin et al. | 438/464 |
| 2007/0169849 A1* | 7/2007 | Yahagi et al. | 144/366 |
| 2007/0209398 A1* | 9/2007 | Cimo et al. | 65/273 |
| 2007/0289847 A1* | 12/2007 | Nakamura | 198/617 |
| 2008/0085378 A1* | 4/2008 | Miyamoto | 427/595 |
| 2010/0107848 A1* | 5/2010 | Joseph et al. | 83/862 |
| 2010/0192634 A1* | 8/2010 | Higuchi et al. | 65/60.1 |
| 2010/0215936 A1* | 8/2010 | Canale et al. | 428/220 |
| 2010/0263525 A1* | 10/2010 | Siebers et al. | 89/36.02 |
| 2011/0023548 A1* | 2/2011 | Garner et al. | 65/106 |
| 2011/0176236 A1* | 7/2011 | Lu et al. | 359/883 |
| 2011/0177290 A1* | 7/2011 | Tomamoto et al. | 428/142 |
| 2011/0177325 A1* | 7/2011 | Tomamoto et al. | 428/332 |
| 2011/0177347 A1 | 7/2011 | Tomamoto et al. | |
| 2011/0192878 A1* | 8/2011 | Teranishi et al. | 226/1 |
| 2011/0200812 A1* | 8/2011 | Tomamoto et al. | 428/220 |
| 2011/0217521 A1* | 9/2011 | Teranishi et al. | 428/189 |
| 2011/0223386 A1* | 9/2011 | Tomamoto et al. | 428/156 |
| 2012/0017642 A1* | 1/2012 | Teranishi et al. | 65/105 |
| 2012/0024928 A1* | 2/2012 | Matsumoto et al. | 225/2 |

FOREIGN PATENT DOCUMENTS

| | | | |
|---|---|---|---|
| EP | 2 336 048 | | 6/2011 |
| EP | 2 336 049 | | 6/2011 |
| EP | 2 336 050 | | 6/2011 |
| EP | 2 343 248 | | 7/2011 |
| JP | 06-000915 | | 1/1994 |
| JP | 2003-034545 | | 2/2003 |
| JP | 2004-182530 | | 7/2004 |
| JP | 2005-212364 | | 8/2005 |
| JP | 2007-090860 | | 4/2007 |
| JP | 2007-191363 | | 8/2007 |
| JP | 2007-246298 | | 9/2007 |
| JP | 2010-105900 | | 5/2010 |
| WO | WO/2010/038761 | * | 4/2010 |

* cited by examiner

CLEAVING METHOD FOR A GLASS FILM

TECHNICAL FIELD

The present invention relates to an improvement of a technology for cleaving a glass film by a thermal stress generated along with localized heating performed along a preset cleaving line of the glass film and cooling of a heated region resulting from the localized heating.

BACKGROUND ART

As is well known, flat panel displays (FPDs) have become mainstream as image display devices in recent years, the FPDs being typified by a liquid crystal display, a plasma display, a field emission display, an OLED display, and the like. Progress is being made toward reducing the weight of those FPDs, and hence glass substrates used for the FPDs are also currently becoming thinner (being formed as a glass film).

Further, there is a growing use of an organic light-emitting diode as a plane light source, such as a light source for interior illumination, which emits only monochrome (for example, white) light, unlike a display that uses TFTs to blink light of three fine primary colors. Further, when an illumination device that uses the organic light-emitting diode includes a glass substrate having flexibility, a light-emitting surface is freely deformable. Therefore, from the viewpoint of ensuring sufficient flexibility, there is also promoted further thinning of the glass substrate to be used for the illumination device.

In addition, as disclosed in Patent Literature 1, a thin glass sheet such as a glass film is utilized for reducing weight of window sheet glass by laminating the glass sheet on both surfaces of a transparent plate made of an organic resin.

The glass film to be utilized in various fields as described above is cut to a predetermined size depending on a product size or the like. As a cutting method therefor, there is employed a method of cleaving the glass film by locally heating and cooling the glass film, and propagating an initial crack formed in the glass film by a thermal stress generated through the heating and cooling (see, for example, Patent Literature 2).

Specifically, in such a technique, under a state in which the glass sheet is placed on, for example, a processing table made of metal, the glass film is locally heated by applying a laser beam along the preset cleaving line of the glass film, and then the heated region resulting from the heating is locally cooled by a cooling device. Accordingly, the thermal stress is generated in the glass film to propagate, along the preset cleaving line by the thermal stress, the initial crack formed in advance at a leading end portion of the preset cleaving line so that the glass film is cleaved.

However, in the above-mentioned technique, the processing table made of metal or the like is held in contact with a back surface of the glass film, and hence the heat applied to the glass sheet through the localized heating using a laser or the like is easily dissipated toward the processing table having a high thermal conductivity. Thus, it is difficult for the thermal stress to act on the glass film efficiently. In particular, such a problem becomes more conspicuous as the glass film becomes thinner.

To address such a problem, for example, as disclosed in Patent Literature 3, it is conceivable that the thermal stress is caused to act along the preset cleaving line of the glass sheet under a state in which the back surface of the glass sheet is not brought into contact with the processing table or the like by blowing a gas on the glass sheet from below to float the glass sheet.

CITATION LIST

Patent Literature

Patent Literature 1: JP 6-915 A
Patent Literature 2: JP 2003-034545 A
Patent Literature 3: JP 2007-246298 A

SUMMARY OF INVENTION

Technical Problem

However, if the technique as disclosed in Patent Literature 3, in which the glass sheet is floated using a gas at the time of cleaving operation, is applied to a thin glass film, the following problem may newly arise.

Figure 6:
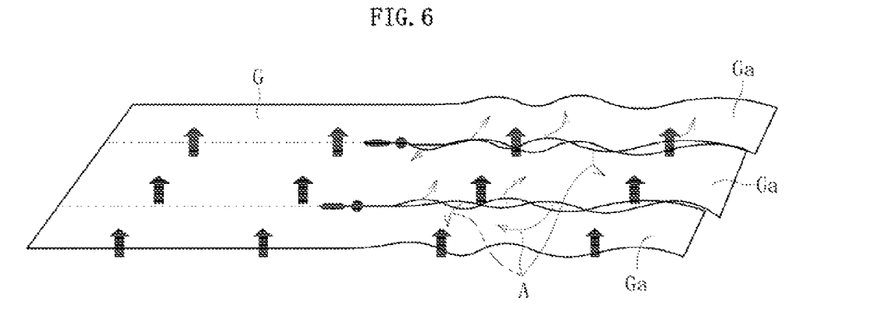
FIG. 6 An explanatory view illustrating a problem inherent in a conventional cleaving method.

Specifically, as the glass film becomes thinner, the glass film becomes more flexible, but may be damaged more easily. Therefore, as illustrated in FIG. 6, when a glass film. G is floated by directly blowing a gas on the glass film G from below, as the cleaving work proceeds, individual glass films Ga after the cleaving operation is finished greatly vibrate while fluttering, due to the gas (arrows A of FIG. 6) leaking upward through a clearance between cleaved surfaces of the glass films Ga. Therefore, cleaved end surfaces of the glass films Ga adjacent in a width direction thereof rub against each other, with the result that cleaving failure may occur. For example, defects such as chipping and cracks, which may be a factor of damage to the glass films Ga, occur in the cleaved end surfaces of the glass films Ga, and by extension, fracture actually occurs resulting in damage to the glass films Ga.

In view of the above-mentioned circumstances, the present invention has a technical object to efficiently cleave a glass film by a thermal stress without causing any cleaving failure.

Solution to Problem

According to the present invention provided in order to solve the above-mentioned problem, a cleaving method for a glass film, in which the glass film is cleaved by propagating, along a preset cleaving line orthogonal to a width direction of the glass film, an initial crack formed at a leading end portion of the preset cleaving line by a thermal stress generated in the glass film through localized heating performed along the preset cleaving line and cooling of a heated region resulting from the localized heating, includes cleaving the glass film under a state in which, in a cleaving region of the glass film, a resin sheet is floated by blowing a gas on the resin sheet from below, and a preset cleaving portion of the glass film including the preset cleaving line is lifted and supported while being covered with the floated resin sheet from below.

With this method, at the time of cleaving operation, the glass film is lifted and supported by the resin sheet that is floated using the gas. Then, in this state, the preset cleaving portion of the glass film including the preset cleaving line is covered with the resin sheet from below. Even when the glass film is cleaved utilizing the thermal stress, the resin sheet is not cut through the localized heating using a laser or the like. Hence, the blown gas is blocked by the resin sheet, and does not flow into the clearance between the cleaved surfaces of the glass films. Accordingly, the individual cleaved glass films do not greatly vibrate while fluttering due to the blown gas, and thus the posture of the glass films is also stabilized. As a result, it is possible to reliably prevent the chipping and cracks from occurring in the adjacent cleaved end surfaces of the glass films after the cleaving operation because the cleaved end surfaces of the glass films rub against each other. Besides, the resin sheet is lower in thermal conductivity than metal or the like, and hence the amount of heat to be applied to the glass film at the time of cleaving operation is unlikely to be lost due to heat dissipation toward the resin sheet. Thus, it is possible to efficiently cleave the glass film by the thermal stress without causing any cleaving failure.

In the above-mentioned method, the resin sheet is preferred to be more flexible than the glass film.

With this structure, when the glass film is lifted and supported by the resin sheet, the glass film is not likely to be deformed in such a manner that the glass film is reshaped along the surface of the resin sheet. Thus, under the state in which the preset cleaving portion of the glass film is lifted and supported by the resin sheet, no inappropriate stress acts on the glass film, with the result that the glass film is easily cleaved with high precision by the thermal stress generated through the localized heating and the localized cooling.

In the above-mentioned method, the resin sheet may be wider than the glass film to extend outward off both sides of the glass film in the width direction.

With this structure, the entire widthwise region of the lower surface of the glass film is reliably covered with the resin sheet. Thus, when the glass film is cleaved by the thermal stress, the gas blown on the resin sheet can be prevented more reliably from flowing into the clearance between the cleaved surfaces of the glass films.

The above-mentioned method may further include curving the glass film in the width direction by lifting and supporting the glass film with the resin sheet to form a non-floating region, in which the glass film is prevented from being lifted and supported by the resin sheet, in a region excluding the preset cleaving portion of the glass film.

Specifically, when the weight of the glass film is increased due to upsizing thereof, it may be difficult to lift and support the entire widthwise region of the glass film by the resin sheet that is floated by blowing the gas. Therefore, in this case, as in the above-mentioned method, the glass film may be curved in the width direction to form the non-floating region, in which the glass film is prevented from being lifted and supported by the resin sheet, in part of the glass film in the width direction. With this structure, the weight of the glass film that needs to be lifted and supported by the resin sheet is decreased, and thus, even in a case where the weight of the glass film is increased, the cleaving work can be continued with no problem.

In this case, when the glass film includes disused portions relatively thicker than a widthwise central region of the glass film, the disused portions being formed in both widthwise end portions of the glass film, the disused portions may be included in the non-floating region.

Specifically, the disused portions are relatively thicker than the widthwise central region (available portion) of the glass film, which may serve as an end product, so that the weight per unit length in the width direction is increased. Therefore, by including the disused portions in the non-floating region without actively floating the disused portions, the posture of the entire glass film can be stabilized.

It is preferred that the above-mentioned method further include cleaving the glass film while conveying the resin sheet together with the glass film under a state in which the glass film is lifted and supported by the resin sheet.

With this structure, even in a case where the glass film is required to be cleaved by the thermal stress while conveying the glass film, because the resin sheet moves together with the glass film, the glass film and the resin sheet are not likely to rub against each other. Thus, it is possible to reliably reduce a rate of occurrence of flaws due to the rub, which may occur in the lower surface of the glass film, that is, the surface of the glass film to be brought into contact with the resin sheet. Note that, in a case where there is such a reason that high surface properties are not required in the lower surface of the glass film, the resin sheet may be floated at a fixed position using the gas, and only the glass film may be conveyed so as to slide along the resin sheet.

In the above-mentioned method, the resin sheet is preferred to be made of a foamed resin.

With this structure, the resin sheet has a myriad of voids inside, which are derived from the foamed resin, and hence air present in the voids serves as a heat insulator. Therefore, the amount of heat generated through the localized heating and cooling and applied to the glass film at the time of cleaving operation is unlikely to be dissipated toward the resin sheet. Thus, the thermal stress can efficiently act on the glass film, and the efficiency of cleaving the glass film can be improved.

In the above-mentioned method, it is preferred that the localized heating be performed using a laser.

With this structure, by the heat radiated from the laser, the localized heating of the glass film can be performed efficiently. Note that, as the laser, it is preferred to use a carbon dioxide laser. In this case, an absorption wavelength of the glass can be set appropriate, and the localized heating can be performed simply in a stable state, which reduces cost.

In the above-mentioned method, the glass film is preferred to have a thickness of 300 μm or less.

According to the present invention provided in order to solve the above-mentioned problem, a manufacturing method for a glass roll includes: cleaving, while successively conveying an elongated glass film from a feeding source, the elongated glass film by propagating, along a preset cleaving line orthogonal to a width direction of the elongated glass film, an initial crack formed at a leading end portion of the preset cleaving line by a thermal stress generated in the elongated glass film through localized heating performed along the preset cleaving line and cooling of a heated region resulting from the localized heating; and rolling the cleaved elongated glass film into a roll shape, in which the cleaving includes cleaving the elongated glass film under a state in which a resin sheet is floated by blowing a gas on the resin sheet from below, and a preset cleaving portion of the elongated glass film including the preset cleaving line is lifted and supported while being covered with the floated resin sheet from below.

With this method, in the cleaving, for the same reason as described above, it is possible to efficiently cleave the glass film while preventing the cleaving failure in which the chipping and cracks occur in the cleaved end surfaces of the glass films. Thus, by rolling the glass film having undergone the cleaving step into a roll shape to manufacture the glass roll, a glass roll having a high end surface strength can be manufactured, and this method is highly advantageous also in a practical sense.

In this case, as the feeding source, for example, a glass roll obtained by rolling the elongated glass film into a roll shape or a forming device for forming the elongated glass film continuously may be used.

According to the present invention provided in order to solve the above-mentioned problem, a cleaving apparatus for a glass film, for cleaving the glass film by propagating, along a preset cleaving line orthogonal to a width direction of the glass film, an initial crack formed at a leading end portion of the preset cleaving line by a thermal stress generated in the glass film through localized heating performed along the preset cleaving line and cooling of a heated region resulting from the localized heating, includes: a resin sheet arranged in a cleaving region of the glass film; and floating means for floating the resin sheet by blowing a gas on the resin sheet from below, in which the glass film is cleaved under a state in which a preset cleaving portion of the glass film including the preset cleaving line is lifted and supported while being covered with the resin sheet floated by the floating means from below.

With this structure, it is possible to attain the same action and effect as in the corresponding method described above.

Advantageous Effects of the Invention

As described above, according to the present invention, it is possible to efficiently cleave a glass film by a thermal stress without causing any cleaving failure even when a glass sheet to be cleaved is thin as a glass film.

DESCRIPTION OF EMBODIMENTS

Hereinbelow, embodiments of the present invention are described with reference to the accompanying drawings. Note that, in the following embodiments, an object to be cleaved is assumed as a glass film having a thickness of 300 μm or less, which is to be used for a FPD, an organic light-emitting diode illumination device, a solar cell, or the like. Further, for convenience of the description, in the accompanying drawings, the thickness of the glass film and the thickness of a resin sheet for supporting the glass film are exaggerated.

Figure 1A:
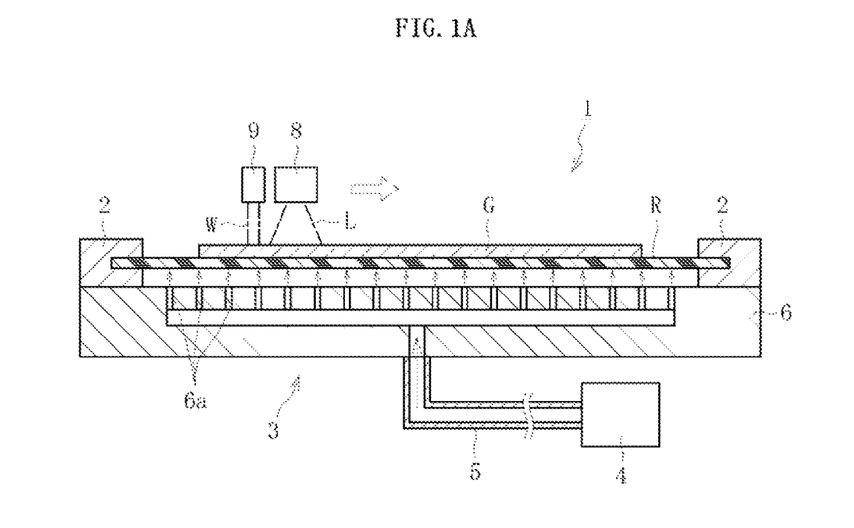
FIG. 1A A vertical sectional view illustrating a practical situation of a cleaving apparatus for a glass film and a cleaving method for a glass film according to a first embodiment of the present invention.
Figure 1B:
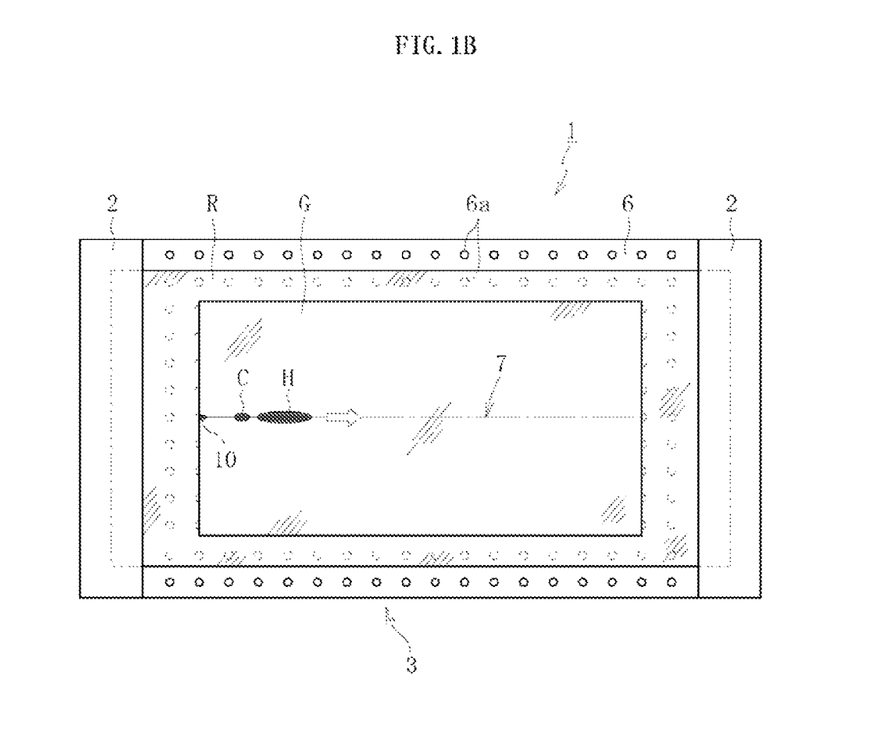
FIG. 1B A plan view illustrating the practical situation of the cleaving apparatus for a glass film and the cleaving method for a glass film according to the first embodiment of the present invention.

FIGS. 1A and 1B are views illustrating a practical situation of a cleaving apparatus for a glass film and a cleaving method for a glass film according to a first embodiment of the present invention. A cleaving apparatus 1 according to the first embodiment of the present invention includes a resin sheet R for supporting a glass film G from below, gripping means 2 for gripping two sides of the resin sheet R opposing in a direction orthogonal to a width direction of the resin sheet R, and floating means 3 for floating the resin sheet R gripped by the gripping means 2 by blowing a gas on the resin sheet R from below. Note that, the gripping means 2 may grip all the four sides of the resin sheet R.

As illustrated in FIG. 1A, the floating means 3 includes a gas supply source 4, and a floating stage 6 connected to the gas supply source 4 through piping 5. In a top surface of the floating stage 6, a plurality of gas jet holes 6a are provided, and a gas supplied from the gas supply source 4 through the piping 5 is jetted through the respective gas jet holes 6a in an ascending direction. By blowing the gas jetted through the respective gas jet holes 6a on the resin sheet R, the resin sheet R is floated from the top surface of the floating stage 6. Then, by the resin sheet R thus floated, the glass film G is lifted and supported from below. At this time, as illustrated in FIG. 1B, a preset cleaving portion of the glass film G including a preset cleaving line 7 orthogonal to the width direction of the glass film G is covered with the floated resin sheet R from below. Further, positioning pins (not shown) or the like may abut against end edges of the glass film G to perform positioning of the glass film G on the resin sheet R.

The cleaving apparatus 1 includes heating means 8 for performing localized heating by applying a laser beam L from above the glass film G that is lifted and supported by the resin sheet R, and cooling means 9 for jetting cooling water W on a heated region H heated by the heating means 8 from a front surface side of the glass film G. The heating means 8 and the cooling means 9 are scanned along the preset cleaving line 7 of the glass film G. Accordingly, the heated region H obtained by the heating means 8 and a cooled region C obtained by the cooling means 9 sequentially move on the preset cleaving line 7, and a thermal stress acts along the preset cleaving line 7. At a leading end portion of the preset cleaving line 7, an initial crack 10 is formed in advance, and the initial crack 10 is propagated along the preset cleaving line 7 by the thermal stress, with the result that the glass film G is cleaved.

With this structure, firstly, at the time of cleaving operation, the preset cleaving portion of the glass film G including the preset cleaving line 7 is covered with the resin sheet R, and hence the gas blown through the gas jet holes 6a of the floating stage 6 can reliably be blocked by the resin sheet R. As a result, the gas utilized for floating the resin sheet R can reliably be prevented from flowing into a clearance between the cleaved surfaces of the glass film G. Accordingly, the glass film G does not greatly vibrate while fluttering by the gas, and thus the posture of the glass film G can be stabilized. As a result, it is possible to reliably prevent chipping and cracks from occurring in adjacent cleaved end surfaces of the glass film G after the cleaving operation because the cleaved end surfaces of the glass film G rub against each other. Secondly, the resin sheet R is lower in thermal conductivity than metal or the like, and hence the amount of heat to be applied to the glass film G for causing the thermal stress to act thereon is unlikely to be lost due to heat dissipation toward the resin sheet R. Thus, from the above-mentioned two advantages, it is possible to attain an action and effect of efficiently cleaving the glass film G by the thermal stress without causing any cleaving failure.

As illustrated in FIG. 1B, the size of the resin sheet R is larger than that of the glass film G. Specifically, in both the width direction and the direction orthogonal to the width direction, the resin sheet R is in a state of extending outward off the glass film G. Accordingly, the entire lower surface of the glass film G is reliably covered with the resin sheet R.

Thus, when the glass film G is cleaved by the thermal stress, the gas blown on the resin sheet R can be prevented more reliably from flowing into the clearance between the cleaved surfaces of the glass film G.

Further, the resin sheet R has a higher flexibility than the glass film G, and is made of, for example, the following material. Specifically, the resin sheet R is made of a material appropriately selected from the group consisting of polyethylene, polyvinyl chloride, polyvinylidene chloride, polyvinyl alcohol, polypropylene, polyester, polycarbonate, polystyrene, polyamide, and a copolymer such as a polyethylene copolymer. At this time, also from the viewpoint of ensuring the flexibility, it is preferred that the resin sheet R have a thickness of 1 mm or less.

Figure 2:
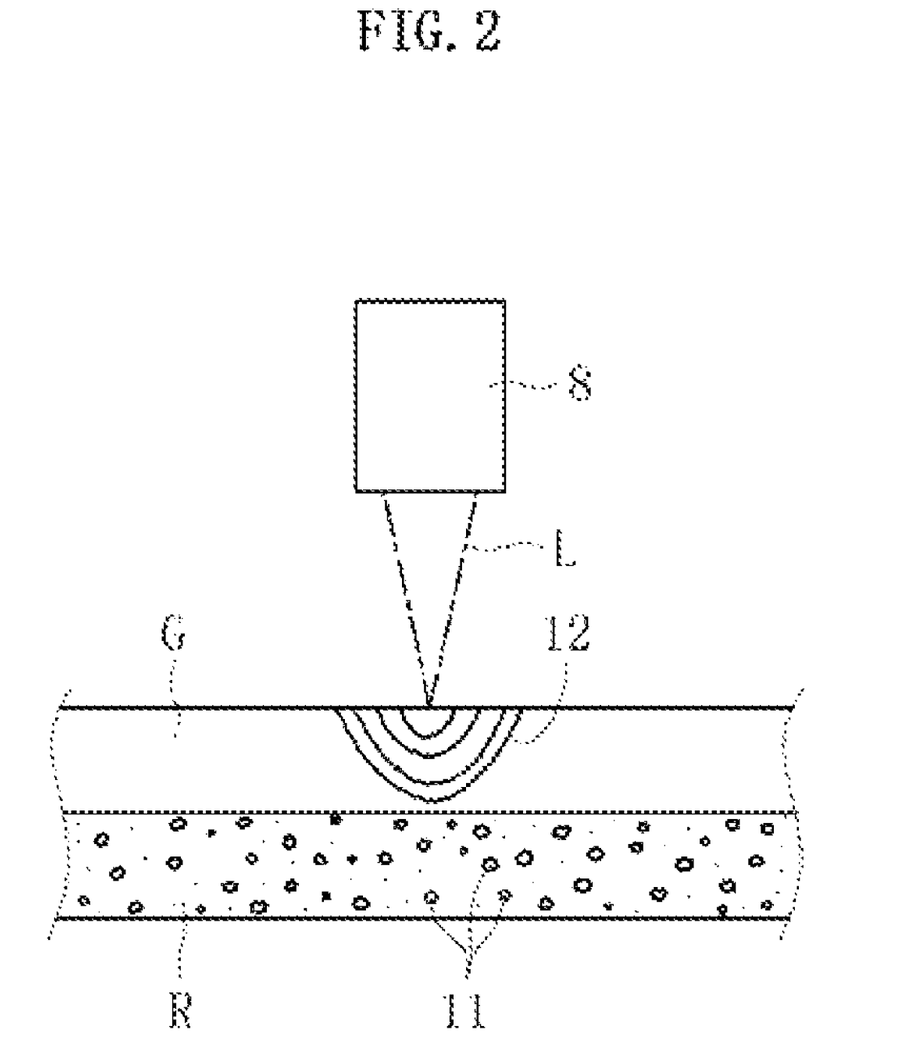
FIG. 2 A vertical sectional view illustrating states of the glass film and a resin film at the time of cleaving operation.

Further, it is preferred that the resin sheet R have such a heat resistance that the resin sheet R can withstand the heat applied to the glass film G by the heating means 8. Therefore, in this embodiment, as illustrated in FIG. 2, the resin sheet R is made of a foamed resin obtained by foaming one of the resins exemplified above. Accordingly, air present in a myriad of voids (air voids) 11 formed in the resin sheet R serves as a heat insulator, and thus the heat resistance against the heat applied by the heating means 8 (heat distribution indicated by reference numeral 12 of FIG. 2) can be easily and reliably imparted to the resin sheet R. Further, in this case, by the heat insulating action of the resin sheet R, the heat applied to the glass film G is unlikely to be dissipated toward the resin sheet R, and thus there is also attained an advantage that the thermal stress can act on the glass film G without any loss. Note that, the foamed resin that forms the resin sheet R has an expansion ratio of, for example, 5 to 50.

Note that, the heating means 8 and the cooling means 9 only need to move relative to the glass film G, and hence the floating stage 6 may move under a state in which the heating means 8 and the cooling means 9 are arranged at a fixed position so that the glass film G moves together with the resin sheet R.

Further, as the heating means 8, a laser such as a carbon dioxide laser may be used, but alternatively, there may be used means for performing another type of localized heating such as heating with a heating wire or hot air blast. Similarly, as the cooling means 9, the cooling water W may be used as the coolant using an air pressure or the like, but alternatively, there may be used, as the coolant, a cooling liquid other than the cooling water, a gas such as air or an inert gas, a mixture of a gas and a liquid, a mixture of a solid such as solid carbon dioxide or ice and the gas and/or the liquid, or the like.

Figure 3A:
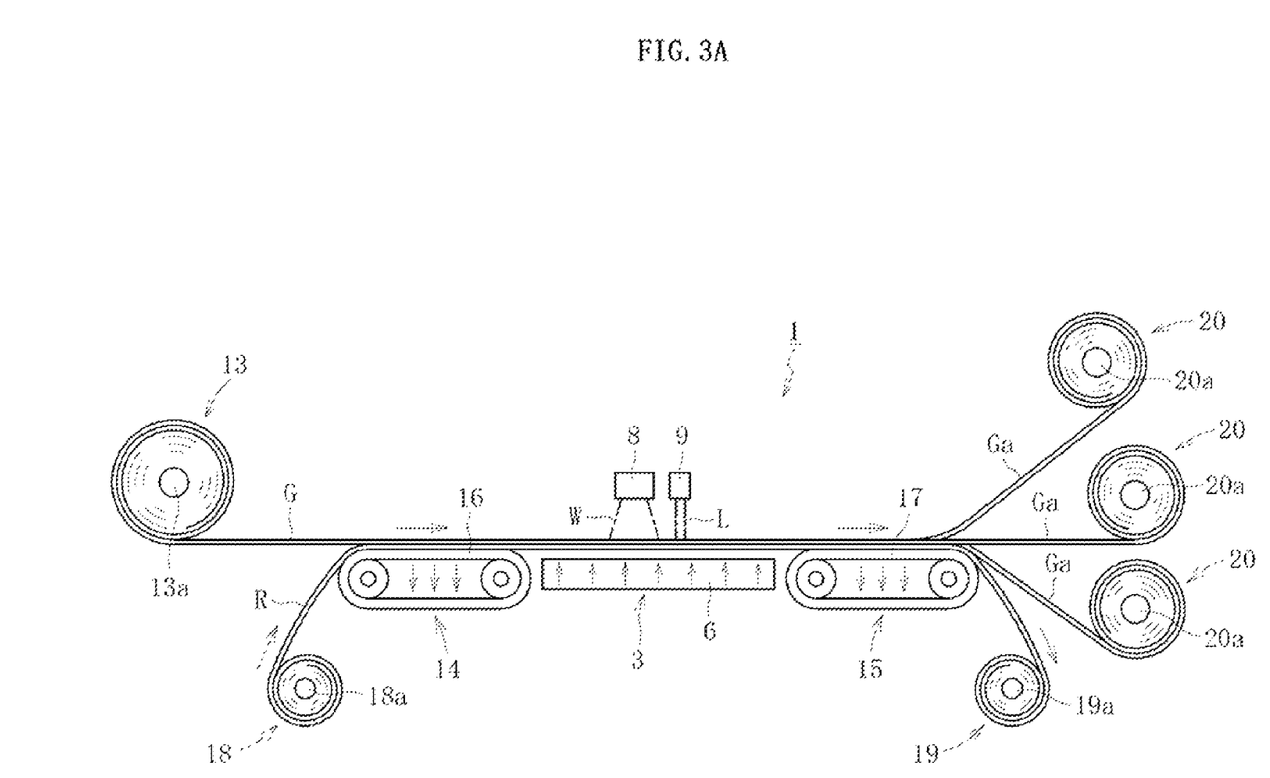
FIG. 3A A side view illustrating a practical situation of a cleaving apparatus for a glass film and a cleaving method for a glass film according to a second embodiment of the present invention.
Figure 3B:
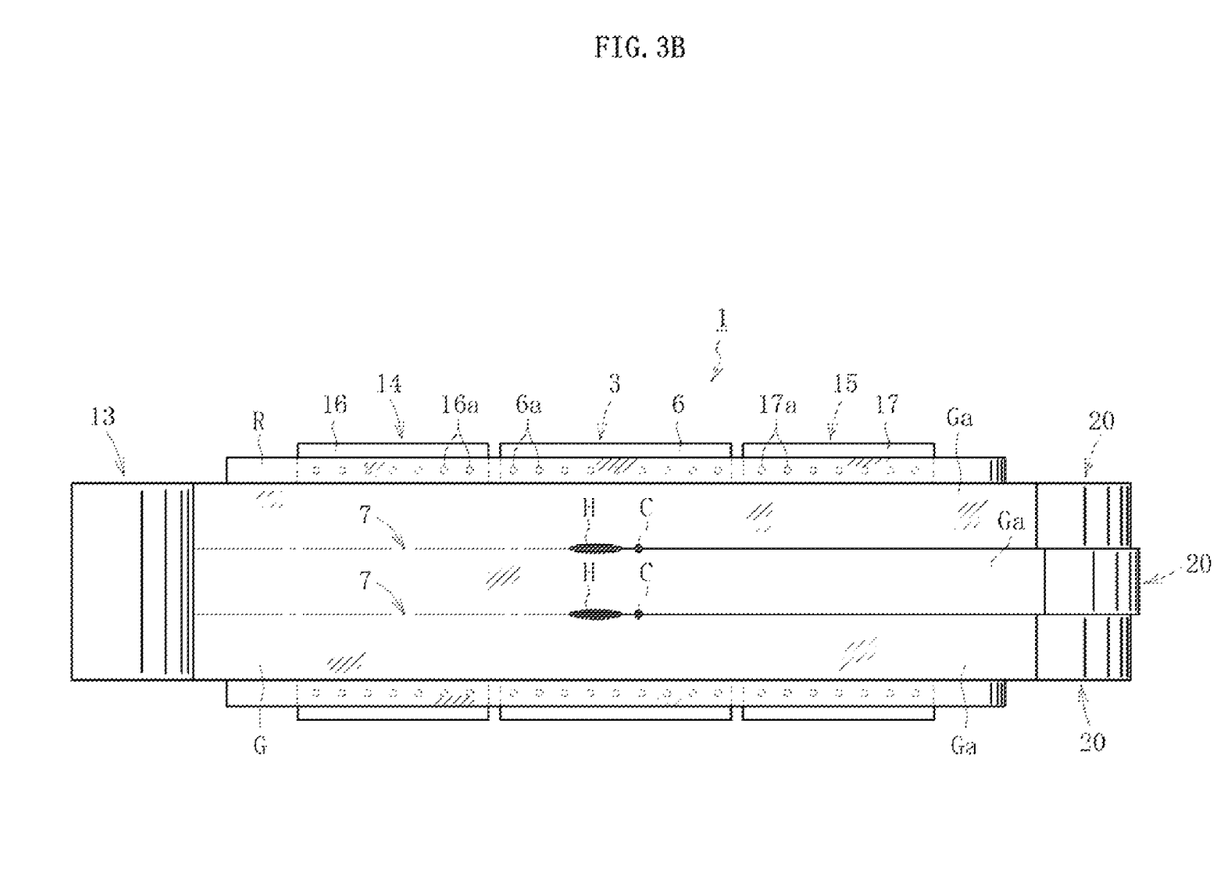
FIG. 3B A plan view illustrating the practical situation of the cleaving apparatus for a glass film and the cleaving method for a glass film according to the second embodiment of the present invention.

FIGS. 3A and 3B are views illustrating a practical situation of a cleaving apparatus for a glass film and a cleaving method for a glass film according to a second embodiment of the present invention. The second embodiment is different from the first embodiment in that a cleaving step is executed while conveying an elongated glass film G.

Specifically, in a cleaving apparatus 1 according to the second embodiment, a glass roll 13 obtained by rolling the elongated glass film G around a roll core 13a is arranged on an upstream side, and the glass film G unrolled from the glass roll 13 on the upstream side is transported toward a downstream side. Then, on a transport path of the glass film G unrolled from the glass roll 13 on the upstream side, there are arranged a first conveyor 14, a floating stage 6, and a second conveyor 15 in the stated order from the upstream side.

The first conveyor 14 and the second conveyor 15 have the same structure, and as illustrated in FIG. 3B, respective conveyor belts 16 and 17 have a myriad of gas suction holes 16a and 17a. On a lower upstream side of the first conveyor 14, a resin roll 18 obtained by rolling an elongated resin sheet R around a roll core 18a is arranged. The resin sheet R unrolled from the resin roll 18 is suspended between the conveyor belt 16 of the first conveyor 14 and the conveyor belt 17 of the second conveyor 15, and is sequentially rolled around a roll core 19a of a resin roll 19 arranged on a lower downstream side of the second conveyor 15. At this time, the resin sheet R is transported toward the downstream side while being attracted to the conveyor belts 16 and 17 of the respective first conveyor 14 and second conveyor 15.

The floating stage 6 floats the resin sheet R suspended between the first conveyor 14 and the second conveyor 15 from a top surface of the floating stage 6 by blowing a gas on the resin sheet R through gas jet holes 6a.

The glass film G unrolled from the glass roll 13 arranged on the upstream side is placed on the resin sheet R suspended between the first conveyor 14 and the second conveyor 15, and is transported toward the downstream side together with the resin sheet R. At this time, the glass film G is lifted and supported by the floated resin sheet R at a position corresponding to the floating stage 6, and in this state, a thermal stress acts on the glass film G by the heating means 8 and the cooling means 9, to thereby cleave the glass film G into a plurality of divided glass films Ga. After transport tracks of the glass films Ga are vertically separated from one another on the downstream side of the second conveyor 15, the glass films Ga are respectively rolled around corresponding roll cores 20a arranged on the downstream side of the second conveyor 15, and are stored again in the form of glass rolls 20. In other words, in this embodiment, the cleaving step is executed for the glass roll 13 using a so-called roll-to-roll method. Note that, in the illustrated example, the glass film G unrolled from one glass roll 13 is divided into three in the width direction, and using the divided glass films Ga, three glass rolls 20 are produced.

Figure 4:
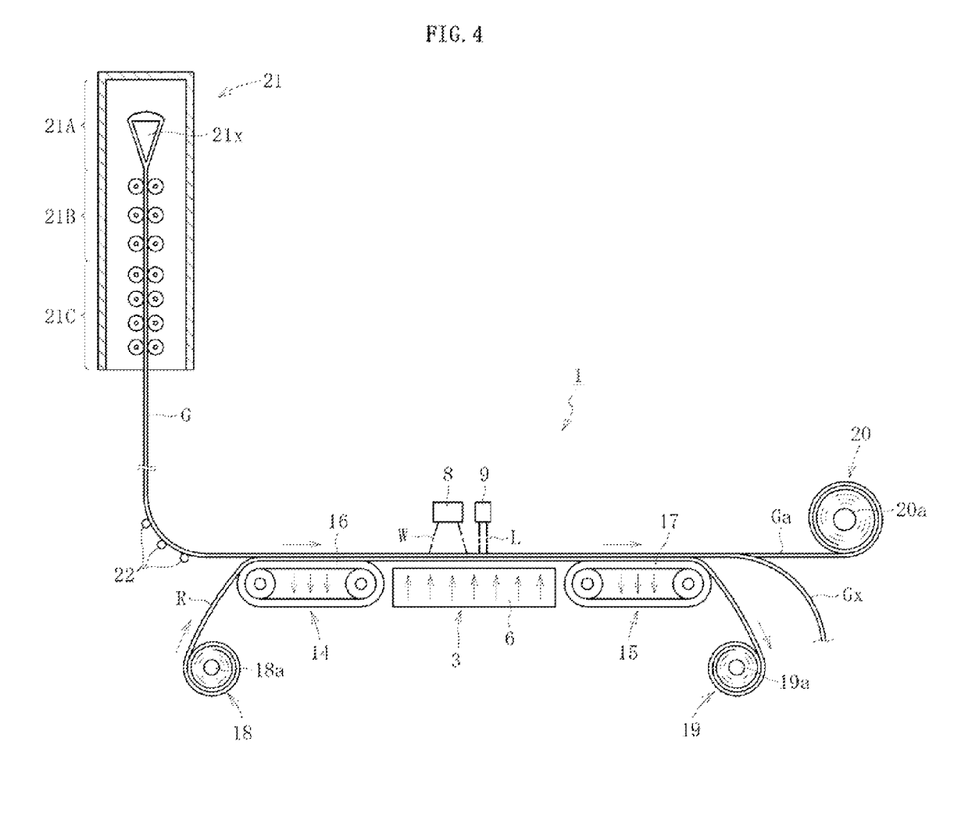
FIG. 4 A side view illustrating a practical situation of a cleaving apparatus for a glass film and a cleaving method for a glass film according to a third embodiment of the present invention.

FIG. 4 is a view illustrating a practical situation of a cleaving apparatus for a glass film and a cleaving method for a glass film according to a third embodiment of the present invention. The third embodiment is different from the second embodiment in that a cleaving step is directly executed for a glass film G drawn out of a forming device 21 for forming the glass film G.

Specifically, the forming device 21 carries out an overflow downdraw method, and includes, in the following order from above, a forming zone 21A having a forming member 21x inside a forming furnace, an annealing zone 21B having annealing means (annealer), and a cooling zone 21C having cooling means. The glass film G drawn downward from the cooling zone 21C of the forming device 21 is conveyed in a lateral direction while being smoothly curved by conversion rollers 22, and is then placed on a resin sheet R suspended between a first conveyor 14 and a second conveyor 15 so that the glass film G is transported toward a downstream side. At this time, the glass film G is lifted and supported by the floated resin sheet R at a position corresponding to a floating stage 6 arranged between the first conveyor 14 and the second conveyor 15, to thereby cleave the glass film G. Specifically, in the glass film G formed by the forming device 21, there are formed, in both widthwise end portions of the glass film G, disused portions Gx relatively thicker than an available portion Ga in a widthwise central region of the glass film G due to contact of rollers. The disused portions Gx are portions that do not serve as an end product, and hence the glass film G is cleaved, and the cleaving operation is performed between the available portion Ga and the disused portions Gx. Then, the available portion Ga is rolled around a roll core 20a arranged on the downstream side of the second conveyor 15, and is stored again in the form of a glass roll 20. On the other hand, the disused portions Gx are conveyed downward on the downstream side of the second conveyor 15 to be discarded.

Note that, in addition to the overflow downdraw method, the forming device 21 can carry out other downdraw methods such as a slot downdraw method or a redraw method.

Further, similarly to the second embodiment, the available portion Ga may further be cleaved into a plurality of divided available portions.

Figure 5A:
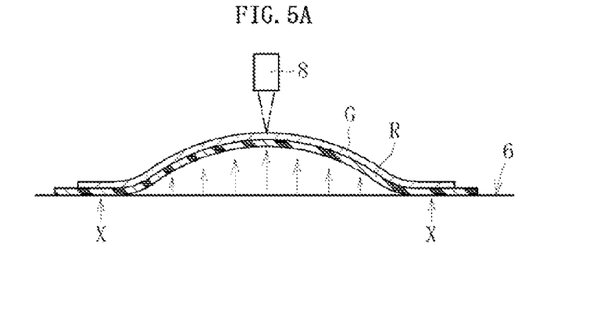
FIG. 5A A vertical sectional view illustrating a practical situation of a cleaving method using a cleaving apparatus for a glass film according to a fourth embodiment of the present invention.
Figure 5B:
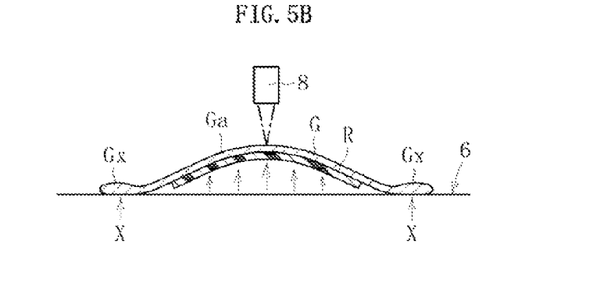
FIG. 5B A vertical sectional view illustrating another practical situation of the cleaving method using the cleaving apparatus for a glass film according to the fourth embodiment of the present invention.
Figure 5C:
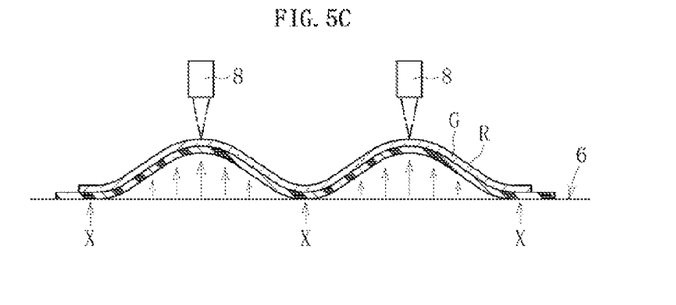
FIG. 5C A vertical sectional view illustrating a further practical situation of the cleaving method using the cleaving apparatus for a glass film according to the fourth embodiment of the present invention.

FIGS. 5A to 5C are views illustrating a practical situation of a cleaving method using a cleaving apparatus for a glass film according to a fourth embodiment of the present invention. The fourth embodiment is different from the first to third embodiments in that a glass film G is curved in a width direction thereof by lifting and supporting with a resin sheet R, and non-floating regions X, in which the glass film G is not lifted and supported by the resin sheet R, are formed in part of the glass film G in the width direction.

Specifically, as illustrated in FIG. 5A, under a state in which both widthwise end portions of the resin sheet R are held in contact with a top surface of a floating stage 6, only a widthwise central region of the resin sheet R is floated so that the entire resin sheet R is curved in the width direction. By supporting the glass film G from below with the curved resin sheet R, the glass film G is similarly curved in the width direction. Accordingly, only a widthwise central region of the glass film G including a preset cleaving line 7 is lifted and supported by the resin sheet R. In other words, both widthwise end portions of the glass film G correspond to the non-floating regions X by being brought into contact with the top surface of the floating stage 6 through the intermediation of the resin sheet R. With this structure, the weight of the glass film G that needs to be lifted and supported by the resin sheet R is decreased, and thus, even in a case where the weight of the glass film G is increased due to upsizing thereof or the like, the cleaving work can be performed with no problem.

Further, as illustrated in FIG. 5B, in a case where disused portions Gx are formed in both the widthwise end portions of the glass film G, it is preferred that the disused portions Gx correspond to the non-floating regions X. This is because the disused portions Gx are relatively thicker than an available portion Ga in the widthwise central region of the glass film G so that the weight is increased. Note that, as described in the third embodiment, the disused portions Gx are finally discarded, and hence the disused portions Gx may be brought into direct contact with the top surface of the floating stage 6 without being protected by the resin sheet R. To give an additional remark, the resin sheet R in this case does not need to extend off both sides of the glass film G in the width direction.

In addition, as illustrated in FIG. 5C, the resin sheet R floated above the floating stage 6 may be curved in the width direction a plurality of times so that the non-floating regions X are formed in a plurality of places in the width direction of the glass film G supported by the resin sheet R. This structure can more reliably support the upsizing of the glass film G.

Note that, the present invention is not limited to the above-mentioned embodiments, and may be carried out in various modes. For example, in the above-mentioned embodiments, protective films may be attached to the surfaces of the glass films after the cleaving operation by a lamination process or the like. Accordingly, the glass films after the cleaving operation are protected by the protective films, and thus it is possible to reliably prevent damage to the glass films at the time of handling, storing, and transporting the glass films. Here, an example of the protective film is a film made of a resin selected from the group consisting of polyethylene, polyvinyl chloride, polyvinylidene chloride, polyvinyl alcohol, polypropylene, polyester, polycarbonate, polystyrene, polyamide (for example, nylon (trademark)), and a copolymer such as a polyethylene copolymer.

Further, for that same purpose, a resin layer may be formed on the surface of the glass film by applying a resin onto the glass film after the cleaving operation and curing the resin.

Here, examples of the resin for constructing the resin layer include a silicone polymer (silicone resin), a sol-gel polymer, polycarbonate, polyether sulfone, polyacrylate, polyimide, a cycloolefin copolymer, and polyallylate.

REFERENCE SIGNS LIST 1 cleaving apparatus
2 gripping means
3 floating means
4 gas supply source
6 floating stage
6a gas jet hole
7 preset cleaving line
8 heating means
9 cooling means
10 initial crack
13, 20 glass roll
14, 15 conveyor
16, 17 conveyor belt
16a, 17a gas suction hole
18, 19 resin roll
21 forming device
21x forming member
21A forming zone
21B annealing zone
21C cooling zone
22 conversion roller
G glass film
Ga available portion
Gx disused portion
R resin sheet

The invention claimed is:

1. A manufacturing method for a glass roll, the manufacturing method comprising:
conveying an elongated glass film from a glass film feeding source along a first side of a resin sheet that is floated by blowing a gas on a second side of the resin sheet opposite to the first side; and
cleaving, while conveying the elongated glass film, a cleaving portion of the elongated glass film that is lifted and supported by the resin sheet by propagating, along a preset cleaving line orthogonal to a width direction of the elongated glass film, an initial crack formed at a leading end portion of the preset cleaving line by a thermal stress generated in the elongated glass film through localized heating performed along the preset cleaving line and cooling of a heated region resulting from the localized heating; and
rolling the cleaved elongated glass film into a roll shape.

2. The manufacturing method for a glass roll according to claim 1, wherein the glass film feeding source comprises a glass roll obtained by rolling the elongated glass film into a roll shape.

3. The manufacturing method for a glass roll according to claim 1, wherein the glass film feeding source comprises a forming device for forming the elongated glass film continuously.

4. The manufacturing method for a glass roll according to claim 1, wherein the glass film and the resin sheet are not fixed to each other.

* * * * *